United States Patent
Platt et al.

(10) Patent No.: US 6,757,837 B1
(45) Date of Patent: Jun. 29, 2004

(54) METHOD AND APPARATUS FOR SOFTWARE FAILURE DIAGNOSIS AND REPAIR

(75) Inventors: David Platt, Mountain View, CA (US); Stephen Lacy, Mountain View, CA (US)

(73) Assignee: Tivo, Inc., Alviso, CA (US)

( * ) Notice: Subject to any disclaimer, the term of this patent is extended or adjusted under 35 U.S.C. 154(b) by 552 days.

(21) Appl. No.: 09/642,255

(22) Filed: Aug. 17, 2000

Related U.S. Application Data

(60) Provisional application No. 60/160,419, filed on Oct. 19, 1999.

(51) Int. Cl.[7] .................................................. G06F 11/00
(52) U.S. Cl. ............................ 714/4; 714/38; 717/171
(58) Field of Search ..................... 714/4, 38; 717/171, 717/172, 173

(56) References Cited

U.S. PATENT DOCUMENTS

| | | | | |
|---|---|---|---|---|
| 6,029,258 A | * | 2/2000 | Ahmad | 714/46 |
| 6,145,088 A | * | 11/2000 | Stevens | 714/2 |
| 6,167,567 A | * | 12/2000 | Chiles et al. | 717/173 |
| 6,170,065 B1 | * | 1/2001 | Kobata et al. | 714/7 |
| 6,327,617 B1 | * | 12/2001 | Fawcett | 709/219 |
| 6,330,690 B1 | * | 12/2001 | Nouri et al. | 714/23 |
| 6,467,088 B1 | * | 10/2002 | alSafadi et al. | 717/173 |
| 6,553,507 B1 | * | 4/2003 | Cohen | 714/4 |

\* cited by examiner

*Primary Examiner*—Scott Baderman
*Assistant Examiner*—Joshua Lohn
(74) *Attorney, Agent, or Firm*—Kirk D. Wong; Hickman Palermo Truong & Becker LLP

(57) ABSTRACT

A client/server system and method for providing a way of repairing software failures as they occur. This system enhances the software architecture of the client device is discussed by detecting a software failure and giving the client the ability to dial up a connection to a repair server designed for supplying repair software. This special diagnostic server takes control of the client device, performs a diagnostic, retrieves log information, and downloads and executes software to repair the failure. The system turns control over from the client device to the repair server to execute commands issued by the repair server. Once the connection to the server is established, all of the intelligence in the diagnostic and repair process is driven by the repair server. This allows the repair server to identify and repair the software failures found in the client device without having to change the software in the client device. The repair process can be performed while on-line with the repair server or deferred until after a reboot.

28 Claims, 5 Drawing Sheets

METHOD AND APPARATUS FOR SOFTWARE FAILURE DIAGNOSIS AND REPAIR

This application claims the benefit of Provisional application Ser. No. 60/160,419, filed Oct. 19, 1999.

BACKGROUND OF THE INVENTION

1. Field of the Invention

The invention relates to a client/server feature providing an emergency diagnosis and repair facility between client and repair server devices. More specifically, the system relates to a process for detecting a software malfunction in a client computer and connecting to a server to repair the malfunction.

2. Description of the Related Art

A personal video device (for example, as manufactured by TiVo, Inc. of Alviso, Calif.) is a complicated product, containing both hardware and software components. Individual devices occasionally suffer from hardware failures, and need to be returned to the factory for repair. These hardware failures tend to be sporadic and random in their occurrence, and (because software is not involved) there is no way to repair the failure other than to send a technician out to fix the hardware.

Software failures can also present a troubling problem. When a software failure occurs, it can potentially affect large number of devices because the same software is running in thousands of systems. A software failure may occur in what looks like a random fashion. For example, the "nines problem" (bad DMA data) tends to occur in a random-like fashion because it is dependent on many timing and usage sensitive conditions in an individual device. On the other hand, a software failure may occur en masse if it results from a latent bug in the software being triggered by data sent to the device.

Some software failures simply crash the machine, or cause the application to malfunction in an annoying but non-critical way. Other software failures can "poison" the device, damaging its stored data in a way which prevents the device from functioning at all.

When a software failure occurs and a device becomes nonfunctional, it is often fairly easy to correct the problem and return the failed device to normal use, if and when the service facility can run a repair program of some sort to correct the damaged data. The hard part is being able to run the repair program on the affected device. Currently, it is difficult or impossible to run any sort of repair program on a device if the device is unable to make a normal daily (program guide) phone call to the personal video service. As a result, when this sort of failure occurs, the service facility must issue an RMA, return the device to the factory for repair, and ship a replacement device to the customer. This is expensive when it occurs occasionally. It could be fatally damaging to a company if the company had to do it en masse due to a software failure affecting tens of thousands of devices.

CLIENT/SERVER

Fault detection and recovery for a software crash is a common issue among software based machinery. A. Federico, *Control Fault Detection for Machine Recovery and Diagnostics Prior to Malfunction*, U.S. Pat. No. 4,514,846, describes a process for monitoring software crashes and preventing them from halting the productivity of the machine. However, this type of fault prevention is combined within the machine and thus has no means of using an outside source to repair any software failures. Because Federico's machine is self-contained, this technique has no way of learning from its mistakes, nor does it offer a way to prevent these malfunctions from occurring in other machines performing the same functions.

D. C. Cromer, Data Processing System and Method for Generating a Detailed Repair Request for a Remote Client Computer System, Pat. No. 6,003,081, describes a technique for detecting a fault, connecting to a remote server, and informing the remote server of the fault. However it does not go ahead and fix the fault. In a complex device, such as a personal video device it is very important to repair the detected software failures as soon as possible to ensure a continuously working system.

SUMMARY OF THE INVENTION

The invention disclosed herein provides a way of repairing software failures in the field. It enhances the current software architecture of the device, by giving the device the ability to "phone home for help" during its boot-and-startup process. A special diagnostic server located at the service facility takes control of the device, performs diagnostics, retrieves log information, and downloads and executes software to repair whatever has gone wrong. This greatly reduces the number of system components which must be working correctly for the invention to function.

The basic philosophy of operation is simple: it phones home, turns over control of the device to a diagnostic server located at the service facility, and executes commands issued by the server. Once the connection to the server is established, all of the intelligence in the diagnosis and repair process is driven by the server. This allows the service facility to react to newly-discovered problems, and enable the diagnostic server to identify and repair them, without having to change any of the software in the device.

The existing device architecture assumes that the devices almost always work correctly. If a device malfunctions in any persistent way, it is difficult for the manufacturer to offer any remedy to its owner other than to box it up, and send it back to the manufacturer for repair or replacement.

Accordingly, it is an object of the invention to provide a reliable running device by detecting and repairing software errors as they occur on this device.

It is another object of the present invention to provide a client computer for running software where any detected software errors are logged as error messages to be repaired.

It is still another object of the present invention to provide a dial up modem connection between a client computer and a server to fix any software errors found on the client computer. These software errors are logged when they are detected and this logged information is uploaded to the server. The server is then able to take control of the client computer to download and run repair-scripts on the client computer during boot up to repair the software errors.

The invention offers several advantages over previously known repair architecture, particularly, software failure detection and repair techniques performed by connecting to a remote server. This repair architecture is improved by providing a simple way for allowing a server to take control over a client computer to repair software errors found on the client computer.

DETAILED DESCRIPTION OF THE PREFERRED EMBODIMENT

The preferred embodiment of the invention provides a mechanism for repairing software failures in the field. It enhances the current software architecture of a personal video device, by giving the device the ability to "phone home for help" during its boot-and-startup process. A special diagnostic server located at a service facility takes control of the device, performs diagnostics, retrieves log information, and downloads and executes software to repair whatever has gone wrong.

The client side of the invention consists of components which detect the request for a service, i.e. the panic signal, phones the service facility, and performs the action ordered by the service diagnostic server.

The server side of the invention consists of programs and scripts which drive the diagnosis repair actions. The server side of the invention is also dependent on issuing commands to the client. Currently, a/bin/bash shell is executed by the client to provide this ability. The server-side script is designed to respond to incoming diagnostic calls, and performs appropriate data-gathering, diagnostic, and repair functions.

BASIC OVERVIEW

Figure 1:
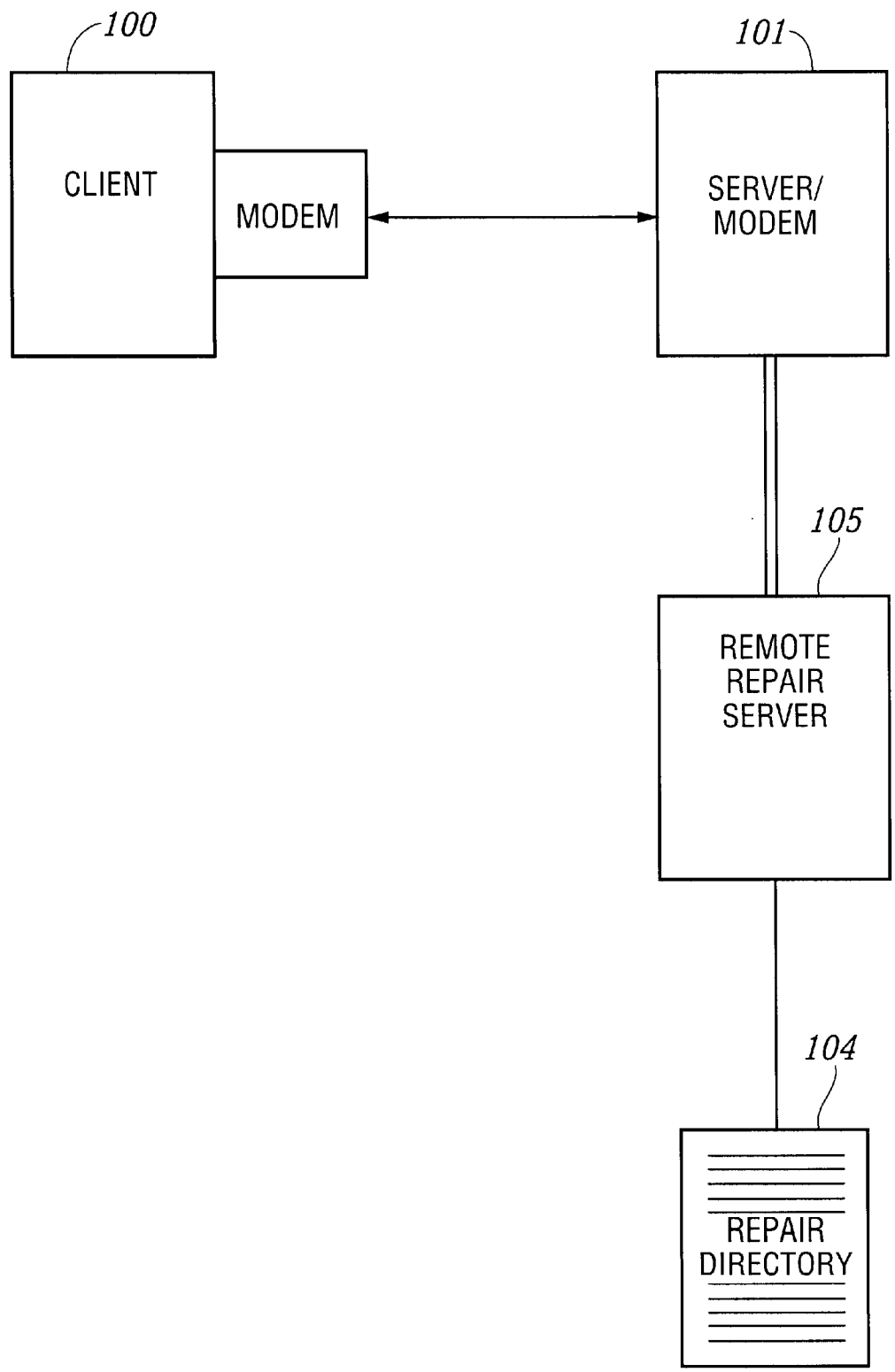
FIG. 1 is a block schematic diagram of a system according to the invention.
Figure 2:
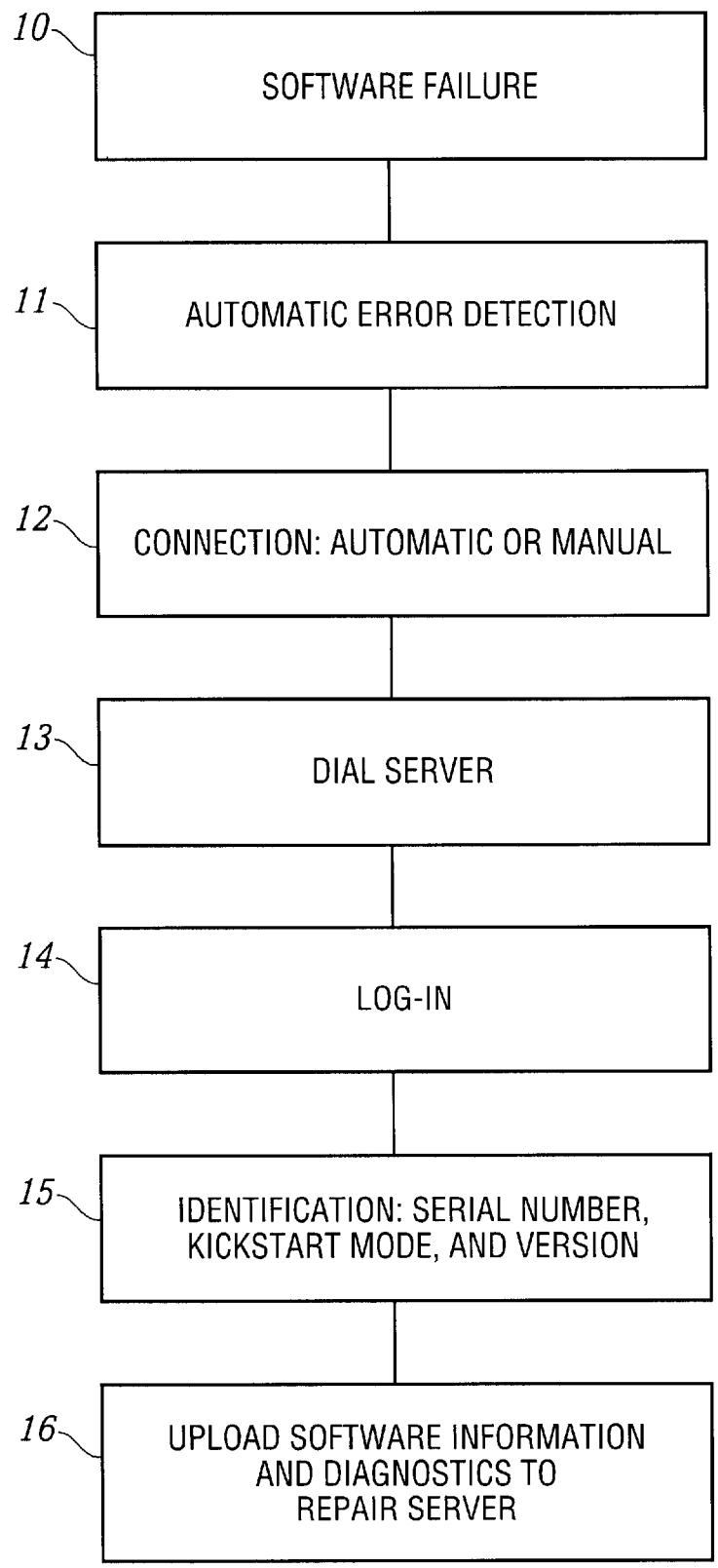
FIG. 2 illustrates the procedure used in identifying a software failure and relaying this information to a repair server.
Figure 3:
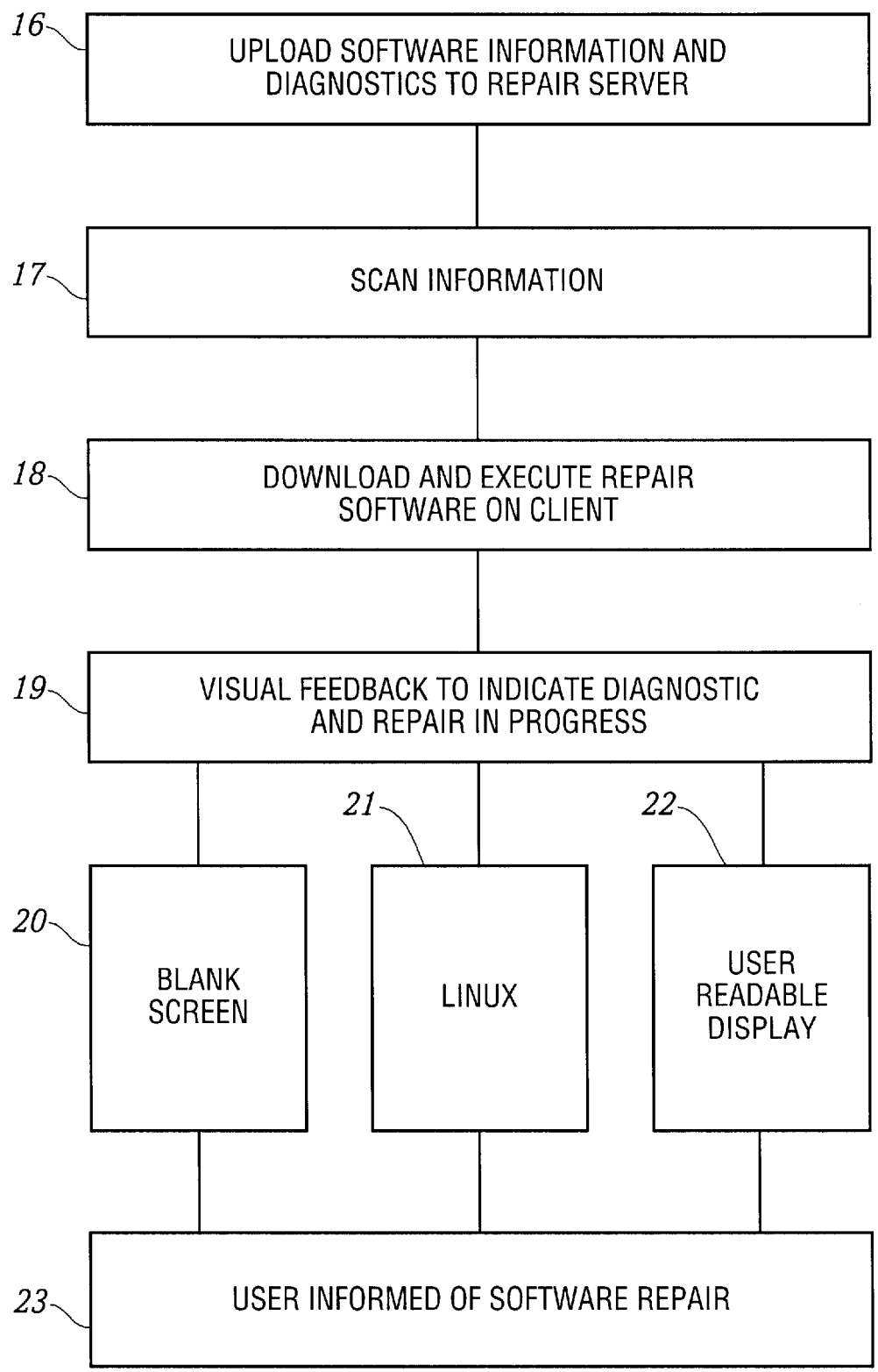
FIG. 3 illustrates the procedure used in scanning the software failure information and repairing the software failure.

The preferred embodiment of the invention produces a more reliable and efficient system by detecting, logging, and repairing all software failures through the help of a remote server. This results in a system capable of repairing its own errors, and ideally a system that never crashes. FIGS. 1–3 describe this process.

The system is comprised of a client computer 100, a remote server 101, and a connection 102 between the two. When client computer is booted up, it immediately begins to check for software failures 10. This check is performed for previously stored errors logged in repair utility sections, as well as checking for any new errors which have recently occurred or stunted the progress of the system. This error detection technique 11 is performed automatically within the client computer.

If errors have been found on this routine boot up check, the system forwards this information to the remote server. A connection to the remote server 12 can be established either automatically (it is always done automatically at boot up) or manually (if a serious software failure has occurred at,any time during system use). To connect to the remote server, a dial up function 13 is used to connect via modem. Once the connection has become established, the client logs-in 14. For the client computer to log-in to the remote server, some important information must be supplied. This identification information 15 comprises, for example, the client's serial number, version, and detected error information (kickstart mode). Once the client has logged in the client is able to upload any software failure information 16 detected during the boot up software failure check, or any other error information detected while running the system.

After the remote server has received the software failure information from the client computer, it stores this information in error-log files. After it has stored this information, 17 it is able to access and search its repair directory 104 for any scripts which are capable of repairing problems which can be identified based on information in the error-log files. If no repairs in the repair directory correspond to the information in the received error-log files, the repair server 105 will save the error-log files for later analysis and problem identification, and will instruct the client computer to terminate the connection and reboot itself.

If one or more repairs in the repair directory do correspond to the information in the received error-log files, the server will begin to download the corresponding repair scripts to the client computer, and will instruct the client computer to execute these scripts at bootup. After the client computer has acquired all of the repair scripts, the connection is terminated and the client computer reboots. During reboot, the client computer begins repairing all of the identified software errors by running the server's downloaded repair scripts. While this repair is in progress, the user is notified 19 by either blank screen 20, a Linux display 21, or any other user-readable display 22. When the repair is completed, the user is notified 23, and the repair scripts are removed from the client computer.

MODEM CONNECTION

The client side of the invention is dependent on knowing the phone number of the server facilities diagnostic server, and the username and password to provide when it logs in. In the current implementation; the device phones the same toll-free "888" number used for a guided setup and currently, daily calls (see for example, the personal video device manufactured by TiVo, Inc. of Alviso, Calif.).

The presently preferred embodiment of the invention sets up a diagnostic server system on the production network, installs the server script and other necessary software, and configures a toll-free-modem server to route a specific login/password combination to a specific TCP port on this server. The toll-free-server system must be maintained in a state of readiness to be able to handle device calls by a substantial portion of a customer base within a relatively short period of time.

Figure 4:
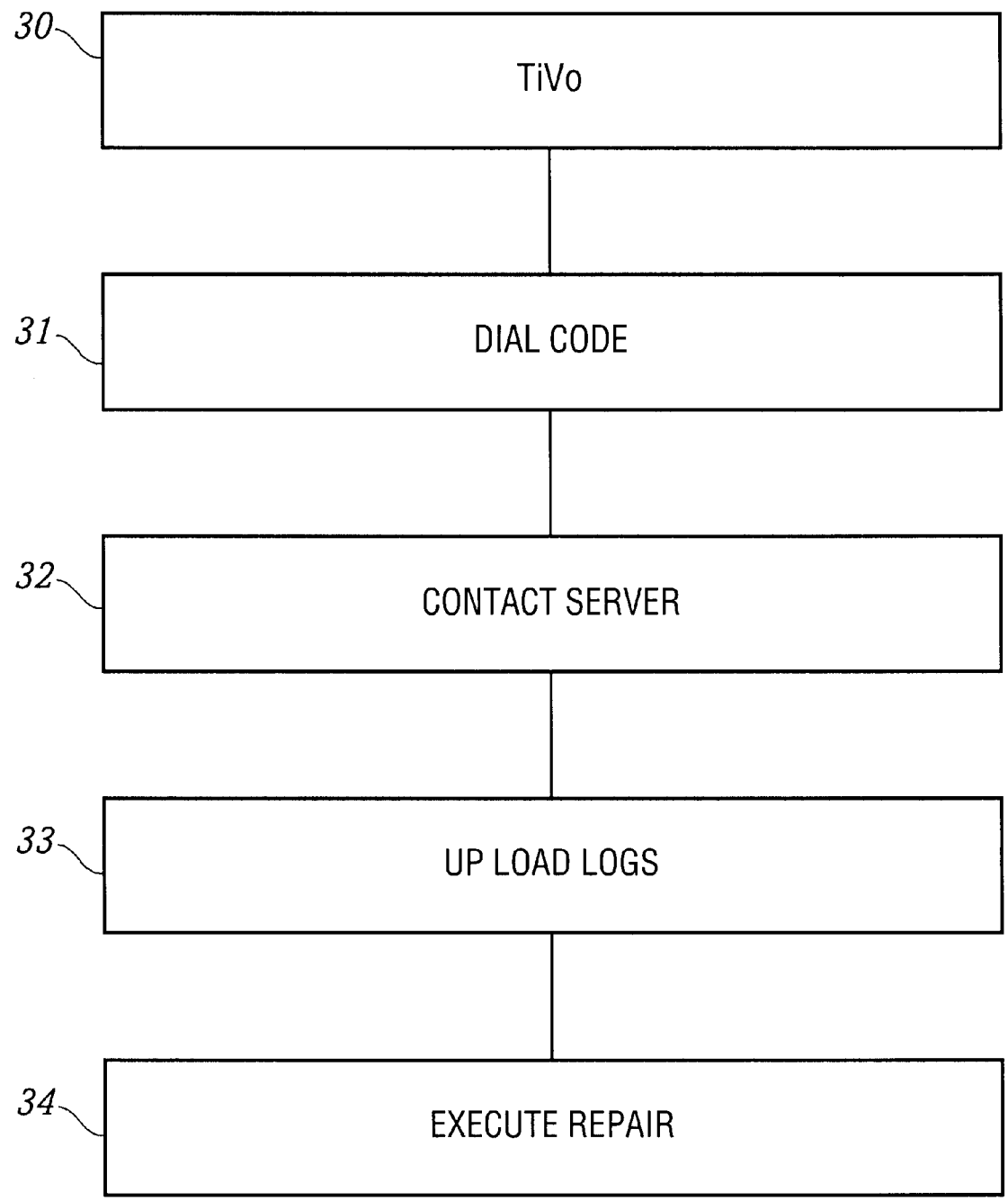
FIG. 4 depicts the procedure used in contacting a repair server.

FIG. 4 shows the connection means between the client computer 30 and the server. On boot up, this system checks for new software failures as well as scanning the repair utility sections for previously logged error messages. If no errors are found, the diagnostic portion of the device is not initiated.

If the user detects an error, they may manually input a "panic signal" that informs the client computer of the existence of a problem state. Additionally, the system itself may detect errors. In either case, the client computer informs the user that a problem state exists and that the repair server may need to contacted. Such feedback is provided by a pair of LED's on the front console of the device. If the user ignores the feedback from the client computer, the system will continue running, in the case of an insignificant error. In the event of a major error, the feedback notification from the client persists until:

1. The user manually connects to the repair server;
2. The system automatically connects to the repair server; or
3. The error forces the system to shut down.

The invention allows the software to detect the panic signal at boot time, and initiate the diagnostic process. A new program, "checkpanic", performs the panic-signal detection, and a new bash script converts the specific panic signal code into a dial-string prefix and initiates the call.

Assuming the user agrees that there is an error, the user then presses the DIAL CODE button 31. This initiates the diagnostic and proceeds to phone the server. If the phone is not connected, not configured correctly, or in some way not able to make an outside call, the diagnostic is unable to contact the server.

The presently preferred embodiment of the invention depends on the receiver having a working modem and a connection to a functional telephone line. This gives the diagnostic the opportunity to select how it dials the server, whether using a toll-free number, a dial-up server, a modem using error control and data conversion, or a simple software controlled modem.

The presently preferred embodiment of the invention depends on the receiver calling to a toll-free telephone number, and establishing a connection to a dedicated repair server. It is preferred that the diagnostic use the same toll-free number and modem banks used for the device's toll-free guided setup calls, but with a different login which directs the call to a special-purpose repair server.

Before the server is dialed, the user instructs the system which dialing regime, tone, pulse or tone-with-9-prefix, to use by selecting the appropriate DIAL CODE button. The diagnostic then tests the selected regime. Upon connection, the diagnostic turns control of the system over to the server. Upon receiving control, the server may upload all of the logs, or instruct the client to examine the logs without uploading, or ignore the logs entirely and immediately download a repair script.

At this time at least one repair command is executed 34 and at least one post-reboot repair program is downloaded for each of the four repair phases. The client computer then begins to reboot itself. On reboot, all of the newly downloaded repair programs are executed. These repair programs are not created to replace the existing software in the client device, instead they are designed to run the system correctly, repair any damaged files or sections, and quickly remove themselves from the system.

The presently preferred embodiment of the invention only has the very simplest of human interfaces. It may have some form of visual feedback to indicate that diagnostic and repair work is underway. In some modes this may involve one or more human-readable screens of explanatory information. Some embodiments of the invention may accept simple input from the user e.g. should I dial '9' before the phone number, while other modes may have no input capability at all. Phoning home for help is important because the ability to make a successful call for help is more important than having a friendly user interface.

The presently preferred embodiment of the invention phones the server, identifies the device, then executes commands under the control of the server. The initial (Linux based) implementation of the diagnostic phones home, identifies itself, and then forks a shell, e.g. /bin/bash, to execute commands from the server. A PROM-based implementation of the diagnostic phones home, identifies itself, and then accepts PROM debug commands from the server.

The diagnostic is capable of talking with the modem port UART and instructing the modem to dial a specific toll-free number. This allow the software to dial the service facility, log in, wait for the server software to respond, and then start processing commands. A new expect script, e.g. kickstart.expect, performs this function. Software to upload log (or other) files to the server, and to accept downloads of repair programs, scripts, and data files, e.g. telecommunications programs used for this purpose. The ZMODEM protocol is used for uploading and downloading files.

All the user needs is a television, a phone, and power. However, in the near future, an Ethernet, or any other accessible connection, can be implemented for speed and reliability.

SCRIPTS

The invention comprises of several components. First, software is used to detect the "panic signal" at boot time, and initiate the diagnostic process. A new program "checkpanic" performs the panic-signal detection, and a new bash script "Kickstart" converts the specific panic signal code into a dial-string prefix and initiates the call. The diagnostic also uses software to dial the service facility, log in, wait for the server software to respond, and then start processing commands. A new expect script, e.g. kickstart expect, performs this function. Another component of the component uses software to execute commands on demand, according to instructions by the server. A standard shell /bin/bash is used for this purpose. Software is also used to upload log (or other) files to the server, and to accept downloads of repair programs, scripts, and data files. The ZMODEM protocol is used for uploading and downloading files. Still another component uses software to execute repair scripts of programs after the diagnostic process has been completed, at several points during the system boot process. The TCD startup script, e.g. rc.sysinit checks for the presence of specially-named files in the /var/tmp directory at four points in the boot process, and execute any such files it finds (precisely once each). Finally, a server-side script responds to incoming diagnostic calls, and performs appropriate data-gathering, diagnostic, and repair functions.

The presently preferred embodiment of the invention is implemented within the Linux operating system environment. It is assumed that the devices hard disk is functional, and that the bootable-kernel and the read-only-root partitions on the hard drive are intact and valid. The diagnostic architecture supports the initiation of the diagnostic from entirely within the PROM, e.g. without access to the hard disk.

The diagnostic does not rely on the integrity of the read/write ("/var") partition on the hard drive, or on the integrity of the MFS file system. It is capable of running, and making contact with the repair server, even if either or both of the /var and MFS file systems have been corrupted. The client is not dependent on MFS, the database, TCPhoneHome, or on the integrity of the /var file system.

The invention allows the software to execute commands on demand, according to instructions by the server. The standard shell /bin/bash is used for this purpose. Software is provided to execute repair scripts of programs after the process has been completed, at several points during the system boot process. A TCD startup script "rc.sysinit" checks for the presence of specially-named files in the /var/tmp directory at four points in the boot process, and execute any such files it finds (precisely once each).

CONTACTING THE REPAIR SERVER

As discussed above, the diagnostic has only the very simplest of human interfaces. It preferably has some form of visual feedback to indicate that diagnostic and repair work is underway. In some modes this may involve one or more human-readable screens of explanatory information. Some embodiments of the invention have the ability to accept simple input from the user, e.g. "Should I dial '9' before the phone number," while other modes may have no input capability at all.

If the diagnostic is not used during boot, it should have no effect on the normal operation of the system. Above all, its simple presence in the system should not be capable of preventing a properly-functioning TCD from booting.

The diagnostic is initiated at boot time, upon request by the user. It is currently preferred that the use of a remote control in a special way, e.g. holding down a specified button during the boot process, will initiate the diagnostic. The system architecture provides for "semi-automatic" initiation of the diagnostic, e.g. initiating the diagnostic automatically if the system fails to start MyWorld successfully after several attempts.

When an error is discovered, the diagnostic can either automatically, or user initiated, phone in for help. The device may also use one or more buttons to trigger a phone for help. These buttons can be located on the device itself, or they may be found on the remote control. These buttons can be standard labeled user friendly buttons, or they may also be color coded, or even still these buttons may contain LEDs used to prompt the user to be pressed when an error has occurred.

REMOTE CONTROL

The user interface (UI) is deliberately kept simple to minimize the risk that software failures in the UI or kernel or drivers might prevent the diagnostic from functioning. It is assumed that users are not attempting to initiate the diagnostic on their own initiative—rather, they do so by following specific instructions given to them by a Customer Care representative. For this reason, the diagnostic UI need not be "self-guiding", intuitively obvious, pretty, or anything of that nature.

Figure 5:
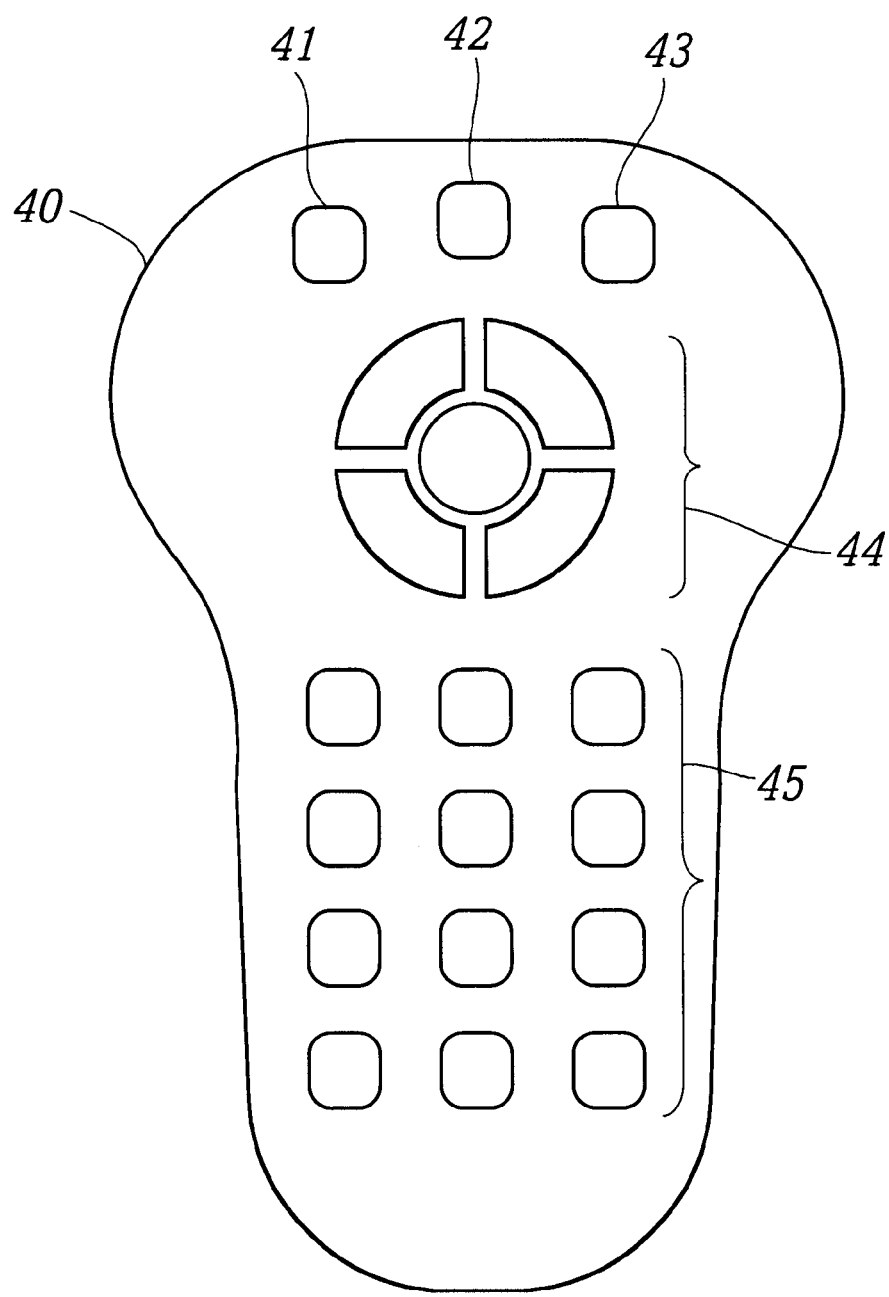
FIG. 5 illustrates a typical remote control which may be used by a client to contact the repair server manually.

Referring to FIG. 5, The user initiates the diagnostic by powering the device off, then on again, and holding down one of the buttons 41–45 on the remote control 40 during the first portion of the boot process. Any button may be held down, as long as it is one of which causes the remote control to transmit a series of "repeat" codes; the "select" and "pause" buttons work nicely. The user observes the following sequence of patterns in the LEDs:

GREEN and OFF—the boot process is progressing normally.

YELLOW and OFF—the system is checking for the diagnostic.

YELLOW and YELLOW—the system has observed a one-second sequence of "repeat" codes, and has entered diagnostic mode.

At this point, the user should release the button being held down, and then press one of the following three number buttons:

0—Dial the repair service using tone dialing.

1—Dial the repair service using pulse dialing.

9—Dial the repair service using tone dialing, with a "9" prefix and a pause.

The LEDs then,change to a yellow and red state, indicating that the diagnostic is in progress.

If the user releases the button he had held down, and does not press one of these buttons within 10 seconds, the diagnostic process is cancelled and the system restarts normally.

There is no further user interface of feedback built into the client side. The server may issue commands to the device which provide further feedback via the LEDs or the screen, or even solicit input from the user via the remote control.

CUSTOMER SERVICE REPAIR

Representatives of engineering and customer care organization at a service facility preferably work together to incorporate the diagnostic into the customer call/RMA process. In many cases, before an RMA is issued on a failing system, an attempt should be made to use the diagnostic to retrieve the system's log files. The failure analysis organization is given a chance to examine the logs. This enables them to eliminate the need to issue an RMA, either by explaining the problem to the system's owner, or by writing a repair script and having the customer initiate a second call.

An ongoing effort by members of the service facility system software organization (and perhaps others) will be required to make best use of the diagnostic. Whenever new "system killer" bugs are identified, the appropriate engineers must identify ways of recognizing the problem, e.g. by scanning log files for specific words or phrases, and if possible write repair scripts or programs which can be downloaded to the affected devices to repair the problem.

In the nastier scenarios, e.g. if the company that makes the device mistakenly distributes software or data which renders a large percentage of the installed base unusable, the service facility will have to do this diagnosis and tool-writing in a hurry.

The presence of the diagnostic in the system must be compatible with normal operations of the device and the standard device service. If the diagnostic feature is not activated at system boot time, it should have no effect on subsequent operation of the device. It should be possible to add new repair scripts and software to the diagnostic server without disrupting repair sessions currently in progress. The diagnostic should be available twenty-four hours a day, seven days a week.

DETECTING FAILURES (LOGS)

The client system preferably looks for different repair utilities sections during boot up. These sections help the client in determining what sections specifically needs to be repaired. This helps in determining any system errors as soon as possible. Thus, flags are created where the utility sections are not running as anticipated. Also, this technique is used so that least amount of repair takes place. Only those sections that are not running as anticipated are repaired instead of repairing the entire boot process. This notifies the service facility which sections are not running as anticipated and determines if these sections can be modified or bypassed without having to change the software. This saves the system a lot of time that was originally spent in connecting to the repair server and downloading new scripts.

Each implementation of the invention preferably includes a command capable of downloading software from the repair server, and a command capable of executing software (either resident, of newly-downloaded). Most implementations include a command that is capable of uploading data, e.g. logs, to the repair server.

The invention works in a specific procedure known as the syndrome analysis. This procedure is used to recognize the problem once an error is detected. Then scripted commands on the repair server are implemented and sent to the client. A scan is then performed on the client where this scan is used to scan the logs of the client to check for error codes to investigate and recognize the problem. Once the problem is determined, or an error message log has been detected, the repair server begins to repair the problem. The client is repaired either by the server taking control and guiding the client, and/or by downloading code to the client to replace the erroneous code, where this code can be installed while on-line with the server, or on boot up of the client system after the connection with the repair server has been disconnected. This technique can greatly improve the quality of the system, allowing the server to test and repair new problems on a large number of systems. This also eliminates the need for technicians to examine and fix each individual system on an individual basis saving both time and money.

When an error is detected, it may be fixed by the client's internal error checking software. If the error cannot be fixed using the client's error checking software, then the error message is stored in an internal log, and the error information is sent to the server. Once the client has been sent the repair utilities from the repair server, these utilities are stored in the repair utility sections. Each of the four repair utility sections are scanned at boot up and the necessary repairs are also performed at boot up. If the problem needs to be fixed immediately, the customer is prompted to phone into the repair server immediately.

FAILURES

Most of the common errors that are detected are errors which can be fixed using the client's internal error checking software. A typical example of a common error is when the disk fills with extra information and becomes clogged with "dead" data. Examples of failures the preferred embodiment of the invention addresses include:

1. Failures which result in a filled-up or otherwise "poisoned" temporary (/var) file system.
2. Failures which result in moderate corruption of the MFS file system, which cannot be repaired by the fsfix program available on the disk, and which do not result in the loss of the entire MFS file system; and
3. Failures which result from the loading of invalid, i.e. inconsistent or poisoned, data into the MFS file system.

The sorts of failures which alternative embodiments of the invention may address include:

1. Failures which corrupt the operating system or boot environment so severely that Linux cannot boot in "read-only" mode. This would include such failures as a corrupted PROM, a corrupted partition table on the hard drive, a corrupted kernel image, or a corrupted read-only root-partition; and
2. Failures which result in the total loss of the MFS file system, or the loss of certain critical-and-large resources such as the video loop sets. Although it is possible in principle to reformat the file system and download new loop sets, the cost of doing so over a modem line is probably prohibitively high—it would be less expensive to RMA the system.

REPAIR

The service facility may have a limited ability to repair certain sorts of problems on devices in the field, by downloading a repair script or program to the devcice during its regular daily call. A script of this sort, known as a run-me, is executed at successful completion of the daily call.

Unfortunately the "run-me" approach has a number of very significant limitations because it depends on the normal daily-call mechanism to distribute the repair script. It is vulnerable to any hardware of software problem which prevents daily calls from being executed , e.g. severe MFS corruption, errors in the database, and errors in distributed software which "poison" the device. Because the repair scripts are distributed through the device service, they must be checked and tested with extraordinary care, almost as much as we applied to a normal software release, to ensure that a malfunction repair script does not crash hundreds or thousands of systems. The device service has only a small amount of information about the state of a specific device at the time of the daily call—for example, it has no way of examining the log files on the device to identify the cause of a system failure, and react appropriately. Repair actions are limited to those which can be done with-the device up and running normally.

The normal boot process is enhanced; to scan for boot-time-repair programs or scripts downloaded by the diagnostic, and execute them at one or more points in the boot process. This enables the repair server to download a complex repair utility to a diagnostic-equipped receiver, instruct the receiver to hang up the phone and reboot, and allow the repair to-take place off-line. In effect, this is similar to a Diagnostic-managed "runme" script.

The client only connects to the actual 'repair server' if a problem needs special attention and can only be fixed by downloading new software. Most failures are fixed using the client's internal software, as described above. When a failure is repaired using downloaded software, the preferred procedure is to use the repair software, or scripts, to fix the failure and then immediately leave. Typically, the preferred technique does not alter any software. The time that it takes to detect and fix a serious problem is reasonably fast. It takes about five minutes to download the repair software, and about 10–15 minutes to run the repair software. Overall, to detect the failure, contact the server, download the software, and fix the failure, it takes the system about thirty minutes.

The diagnostic and its associated server are not able to repair all possible software failures on a device. The diagnostic-and-repair capability should be implemented with the philosophy to store error logs when errors are detected and learn from other failures.

Subsequent PROM-based implementations of the diagnostic may be supported on newly manufactured devices. In addition, this capability may be added to existing receivers if sufficient PROM space is available and if it is decided that updating PROM images in the field is a safe-and sane-thing to do.

It should be apparent to those skilled in the art that various changes in form and details of the invention as shown and described may be made. It is intended that such changes be included within the spirit and scope of the Claims appended hereto.

What is claimed is:

1. A method for providing an emergency diagnostic and repair facility between a client system and a server, said method comprising the steps of:

said client system automatically detecting a software failure and identifying said software failure;

said client system connecting to said server via a communications medium;

said client system automatically transmitting a notification of said identified software failure to said server;

said server automatically downloading a repair script to said client system;

automatically running said repair script on said client system computer to repair said software failure; and wherein said step of detecting said software failure further comprises the step of:
searching repair utility sections on said client system at boot up for error log messages.

2. The method according to claim 1, wherein said step of detecting said software failure further comprises the step of said client system logging an error message of said identified software failure.

3. The method according to claim 2, wherein said step of connecting to said server further comprises the step of using a toll-free connection.

4. The method according to claim 1, wherein said step of detecting said software failure further comprises the step of searching repair utility sections on said client system for error log messages.

5. The method according to claim 1, wherein said step of connecting to said server further comprises the step of prompting a user to initiate said connection to said server.

6. The method according to claim 1, wherein said step of connecting to said server further comprises the step of prompting a user to initiate said connection to said server using a remote control device.

7. The method according to claim 1, wherein said step of notification of said software failure further comprises the step of said client system identifying a serial number, version, and detected software failure of said client system.

8. The method according to claim 7, wherein said step of downloading said repair script to said client system further includes the step of turning over control of said client system to said server.

9. The method according to claim 8, wherein said step of downloading said repair script to said client system further includes the step of downloading said repair script to said client system's repair utility section to be run while said client system is on-line with said server.

10. The method according to claim 8, wherein said step of downloading said repair script to said client system further includes the step of downloading said repair script to said client system's repair utility section to be run at boot up of said client system after said connection to said server has been terminated.

11. The method according to claim 8, wherein said step of downloading said repair script to said client system further includes the step of visually informing a user of the repair process.

12. The method according to claim 11, wherein said step of downloading said repair script to said client system further includes the step of visually informing the user of the repair process by displaying a blank screen.

13. The method according to claim 11, wherein said step of downloading said repair script to said client system further includes the step of visually informing the user of the repair process by using a Linux display.

14. The method according to claim 11, wherein said step of downloading said repair script to said client system further includes the step of visually informing the user of the repair process by using a user readable display.

15. An apparatus for providing an emergency diagnostic and repair facility for a-consumer device, comprising:
means for automatically detecting a software failure on said consumer device and identifying said software failure;
means for connecting said consumer device to a server;
means for automatically transmitting a notification of said identified software failure to said server;
means for automatically downloading a repair script to said consumer device;
means for automatically running said script on said consumer device to repair said software failure; and
wherein said means for detecting said software failure further comprises:
means for searching a consumer device's repair utility section at boot up for error log messages.

16. The apparatus of claim 15, wherein said means for detecting said software failure further comprises means for said consumer device to log an error message of said identified software failure.

17. The apparatus of claim 16, wherein said means for connecting to said server further comprises means for using a toll-free connection.

18. The apparatus of claim 15, wherein said means for detecting said software failure further comprises means for searching said consumer device's repair utility section for error log messages.

19. The apparatus of claim 15, wherein said means for connecting to said server further comprises means for prompting a user to initiate said connection to said server.

20. The apparatus of claim 15, wherein said means for connecting to said server further comprises means for prompting a user to initiate said connection to said server using a remote control device.

21. The apparatus of claim 15, wherein said means for notification of said software failure further comprises means for said consumer device to identify a serial number, version, and detected software failure of said consumer device.

22. The apparatus of claim 21, wherein said means for downloading said repair script to said consumer device further comprises means for turning over control of said consumer device to said server.

23. The apparatus of claim 22, wherein said means for downloading said repair script to said consumer device further comprises means for downloading said repair script to said consumer device's repair utility section to be run while said consumer device is on-line with said server.

24. The apparatus of claim 22, wherein said means for downloading said repair script to said consumer device further comprises means for downloading said repair script to said consumer device's repair utility section to be run at boot up of said consumer device after said connection to said server has been terminated.

25. The apparatus of claim 22, wherein said means for downloading said repair script to said consumer device further comprises means for visually informing a user of a repair process.

26. The apparatus of claim 25, wherein said means for downloading said repair script to said consumer device further comprises means for visually informing a user of the repair process by displaying a blank screen.

27. The apparatus of claim 25, wherein said means for downloading said repair script to said device further comprises means for visually informing the user of the repair process by using a Linux display.

28. The apparatus of claim 25, wherein said means for downloading said repair script to said device further comprises means for visually informing the user of the repair process by using a user readable display.

* * * * *